July 21, 1964
E. C. HUNGATE
3,141,749
APPARATUS FOR TREATING AIR
Original Filed April 2, 1956
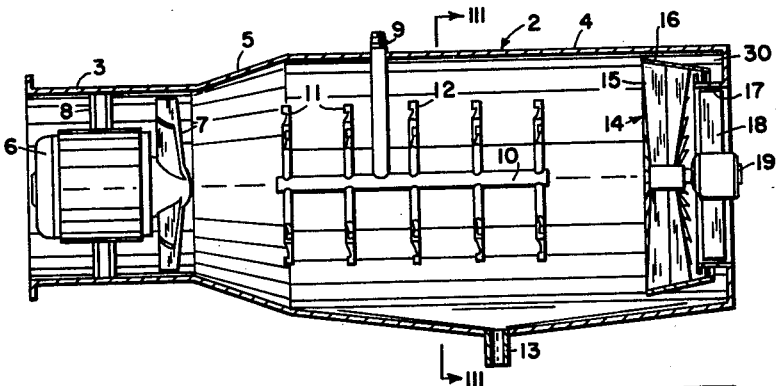
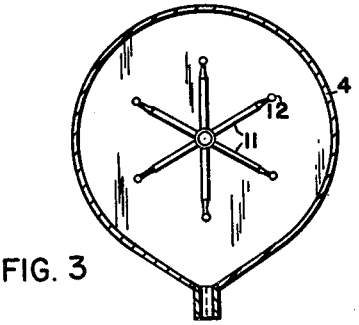
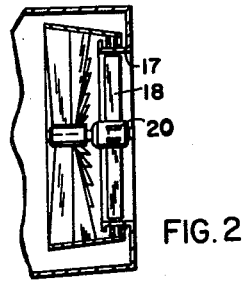
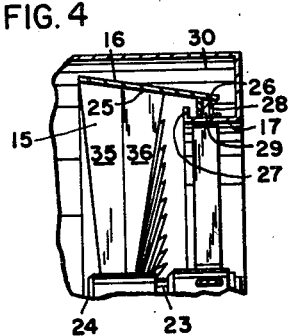
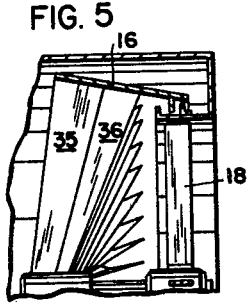
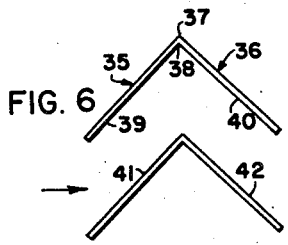
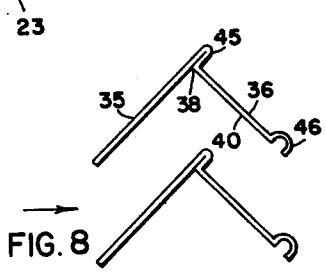
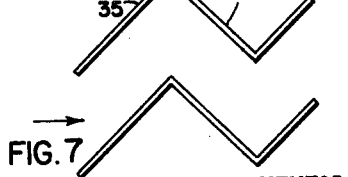
INVENTOR.
ERNEST C. HUNGATE.
BY
*Frederick E. McMullen*
ATTORNEY.

United States Patent Office 3,141,749
Patented July 21, 1964

3,141,749
APPARATUS FOR TREATING AIR
Ernest C. Hungate, Liverpool, N.Y., assignor to Carrier Corporation, Syracuse, N.Y., a corporation of Delaware
Original application Apr. 2, 1956, Ser. No. 575,560, now Patent No. 2,932,360, dated Apr. 12, 1960. Divided and this application Jan. 28, 1960, Ser. No. 5,183
4 Claims. (Cl. 55—407)

This application is a division of my copending application, Serial No. 575,560, filed April. 2, 1956, now Patent No. 2,932,360, issued April 12, 1960, entitled Apparatus for Treating Air, and relates to an apparatus for treating air of the type generally used in air conditioning and air washing systems in which the air stream is placed in direct contact with water by discharge of water into the air stream as it moves through the apparatus.

Heretofore, apparatus for treating air with water as generally utilized in industrial applications have been severely restricted in operating velocities due to the configuration of the eliminators employed in the apparatus. Eliminators are normally used to remove entrained water particles from the air stream before its discharge from the apparatus. The eliminators usually employed consist of a plurality of stationary blades having a general sawtooth cross-section which provide zigzag paths through the eliminators. These eliminators are not effective at velocities below or above a certain critical range. In textile applications, for example, the problem is further aggravated by the presence of lint in the air stream. Lint in the air stream passing through the apparatus is moistened and clings to the surface of the eliminators requiring frequent removal and cleaning of the eliminators.

The chief object of the present invention is to provide a versatile apparatus for treating air over a wide range of air velocities including high air velocities.

An object of the present invention is to provide a self-cleaning apparatus for treating air which will remove lint and dirt particles from the air stream.

A further object is to provide a rotating eliminator which will satisfactorily remove liquid and foreign particles from a high velocity gas stream.

A still further object is to provide an eliminator that is self-cleaning. Other objects of the invention will be readily perceived from the following description.

This invention relates to an apparatus for removing droplets of water from an air stream comprising a rotatably mounted hub, a plurality of radially extending blades secured to the hub and an annular enclosing means placed about the periphery of the blades. The blades preferably have a first planar portion having a desired surface area exposed to the air stream and a second planar portion having a surface area substantially similar to the surface area of the first planar portion exposed to the air stream. The portions are angularly disposed with respect to each other and intersect in a line drawn radially from the hub. A portion defining a channel is associated with the edge of the second planar member.

The attached drawings illustrate a preferred embodiment of the invention in which;

FIGURE 1 is a sectional view of the apparatus of the present invention,

FIGURE 2 is a fragmentary sectional view of a modification of the apparatus shown in FIGURE 1;

FIGURE 3 is a sectional view of the apparatus taken along the line III—III of FIGURE 1;

FIGURE 4 is an enlarged fragmentary view of the eliminator as shown in FIGURE 1 showing details of the eliminator structure and the seal;

FIGURE 5 is a fragmentary view of a modified form of the eliminators shown in FIGURE 1;

FIGURES 6, 7, 8, 9 and 10 are cross sectional views taken on a plane looking toward the hub of the eliminator of modified blade structures which may be utilized in the apparatus as shown in FIGURE 1.

Referring to the drawings, there is shown in FIGURE 1 apparatus for treating air embodying the present invention. This apparatus includes a casing 2 having a first cylindrical section 3 and a second cylindrical section 4 which is of a greater diameter than the first section 3. A transition section 5 connects the first section 3 to the second section 4. The shape of this transition section 5 is of a general frusto-conical nature with a gradual change in cross-sectional area provided to supply a diffusing action which will be described hereinafter. Concentrically located within the first section 3 is a fan-motor 6 having blades 7 adapted to induce an air stream into said first section and into the second section 4. This fan-motor is mounted in the first section 3 by means of suitable pipe struts 8. As previously set forth, the second section 4 is of a general cylindrical shape with a sloped bottom in which is centrally located a drain 13, the function of which will be hereinafter described.

Extending into the second cylindrical section 4 is a suitable water supply line 9 which is connected to the header 10. This header 10 extends concentrically in the second section 4 and has extending therefrom suitable banks of branches 11; the ends of these branches are provided with suitable modulating nozzles which may be of the type disclosed in my co-pending application Serial No. 490,170, filed February 23, 1955, now abandoned.

Referring to FIGURE 3 there is shown a cross-section of the second cylindrical section 4 taken along the line III—III which discloses that each bank of branches comprises six branches 11 which are preferably spaced at approximately equal angular intervals. Referring again to FIGURE 1, it is seen that this particular embodiment utilizes five banks of branches; it is apparent that the number or orientation of branch lines and nozzles may take many different forms depending upon the shape of the second section 4 and the type of modulating nozzle utilized.

At the end of the second cylindrical section 4 as shown in FIGURE 1, there is an opening defined by the inwardly extending flange section 17. Centrally located within this opening is a suitable motor 19 which is supported in a central position by means of suitable struts 18. Extending from this motor, is a suitable shaft having an eliminator 14 mounted thereon having suitable blades 15 and enclosing means 16. Referring now to FIGURE 2, there is shown a modification of the apparatus embodying the invention shown in FIGURE 1. In essence, FIGURE 2 is a fragmentary view showing only the end of the cylindrical casing 4 having the opening defined by the inwardly displaced flange 17 and having located adjacent thereto the eliminator 14. In the embodiment illustrated in FIGURE 2, there is not provided a motor 19 but merely a centrally located bearing structure supported by the struts 18. This bearing structure 20 has extending therefrom a suitable shaft upon which the eliminator is mounted. In this embodiment other means are employed to rotate the eliminator as described hereinafter.

FIGURE 4 is an enlarged fragmentary view of the eliminator and the end section of the second cylindrical section 4. As shown a shaft 23 extends from the bearing 20. It will be remembered that a motor may be utilized instead of the bearing 20, as shown in FIGURE 1. Extending from the bearing 20 is a suitable shaft 23 which is rigidly connected to a hub 24. Blades 15 extend from hub 24. FIGURE 6 is a cross-sectional view of the individual blades which extend radially from the hub 24. Enclosing this radial blade structure is a suitable enclosing means 16 which in the present embodiment is shown as a frusto-conical member having an inner surface 25.

This frusto-conical surface extends beyond the periphery of the bladed structure and has extending therefrom a suitable flange 26 which is an annular shaped member having its outer periphery attached to the frusto-conical surface 16 and having its plane lie normal to the axis of rotation of the hub 24.

Referring now to the construction of the flange 17 which as previously mentioned is attached to the casing 4, there are shown two parallel annular members 27 and 28 which are in spaced relationship. The inner circumference of the annular members is rigidly attached to the flange 17 thereby providing an annular channel 29 about the flange. FIGURE 4 shows that the annular member 26 mounted on the enclosing means 16 of the eliminator extends into this channel 29. The portion of the flange 17 with the annular members 27 and 28 in cooperation with the annular member 26 and the adjacent portion thereto of the enclosing means 16 constitutes a seal which will be described hereinafter.

Referring to FIGURE 6, there is shown a cross-section of two blades of the type utilized in the eliminator shown in FIGURES 1 and 4. As can be seen from FIGURE 6, this blade construction comprises two planar members 35 and 36 which are angularly disposed and intersect at juncture 37 which extends radially from the hub 24 to the enclosing means 16.

Apparatus of the type described basically may carry out a heat transfer process which will result in the humidification or the dehumidification of the air stream depending upon the relative conditions of the air stream and water utilized. This process may be accompanied by an air cleaning process in which the water moistens particles in the air stream causing them to pass out of the drain of the apparatus.

To effectively humidify or dehumidify an air stream by placing water in direct contact with the air stream it is necessary that the water be broken up into very many finely divided particles or droplets, thus providing adequate surface area between the air and the water discharged therein to facilitate evaporation of the water spray or the condensation of moisture from the air by a rapid transfer of heat from one to the other. The rate of heat transfer may be increased by reducing the resistance of the film co-efficient of the surface of the droplets so that under some circumstances recirculation or turbulence of the air stream may be provided. The problem of effectively removing particles or droplets of water entrained in the air stream after the heat transfer process is critical.

As previously mentioned it is common practice to employ stationary eliminator plates in an attempt to remove entrained droplets from the air stream; as previously disclosed these stationary plates provide a plurality of zigzag paths through which the waterladen air stream flows. As the laden air stream passes along these paths, the continual change in direction causes the water to impinge upon the various surfaces of the many plates, at least some of the water droplets collecting thereon and being removed from the air stream. This water drains from the eliminator by gravity into a suitable collecting means located beneath the eliminator plates.

Because of the stationary nature of this type of eliminator the velocity with which the air stream passes through the eliminator and consequently through the apparatus, is very critical so that the range of operating velocities available is very limited. Velocities above this narrow range will result in discharge from the apparatus of treated air carrying entrained water particles. Velocities below this critical range do not cause sufficient impingement and therefore permit the water to carry through the eliminator structure. In either case the operation is wholly unsatisfactory. Since many of these units are used in textile mills the undesirability of water droplets falling upon the equipment and material being processed will be readily appreciated.

In the air treating apparatus of the present invention as indicated in FIGURE 1, air is drawn into the casing 2 by the fan 6 and passes this air into the transition section 5 and then into the main section of the second cylindrical section 4. It is apparent that the air as it travels about the fan motor 6 and through the blading 7 is traveling at high velocities. The gradual increase in cross-section of the transition section causes a diffusing action as the air passes into the second cylindrical section 4. In cylindrical section 4, water at a suitable temperature, depending upon whether humidification or dehumidification is being carried on within the apparatus, is passed from the line 9 into the header 10 and through the various branches 11 and emitted by the various modulating nozzles 12 to form a fine spray within the second cylindrical section 4.

This fine spray is put into direct heat exchange relation with the air passing through this section and either humidification or dehumidification occurs depending upon the relationship of the entering air dew point with respect to the spray water temperature. The air discharged from the apparatus is at a desired temperature and desired dew point. It will be appreciated that the absolute humidity of the air leaving the unit may be less than the incoming air because of the physical fact that the ability of the air to retain moisture decreases as its temperature drops. Therefore heat transfer between chilled water, for example, discharged into the air stream may result in the precipitation of water from the air since the decrease in temperature will result in a decrease in the capacity of the air to retain the moisture.

It will be readily perceived that humidification may also occur; in such case the temperature of the incoming air and the spray water will cause part of the spray water to evaporate, adding to the air moisture content and increasing its humidity.

Passage of the air stream through the water sprays entrains particles of water. In prior equipment, the velocity with which the air stream left the equipment was critical due to the manner in which the stationary eliminators functioned to remove entrained water particles in the air stream and their dependence upon gravity to carry the water from the eliminator surfaces after the water had impinged thereon. In the present invention a novel eliminator of a rotating type is provided in which the entrained water particles impinge upon a plurality of rotating blades as the air stream is discharged from the apparatus. Blades remove the droplets from the air stream and return the water to the apparatus.

The theory of operation of a rotating eliminator primarily resides in an impingement process. Air is induced axially into the rotating blade structure which comprises the eliminator. This air may be in a near saturated condition and include water particles entrained in the air stream. As the air enters the zone in which the rotating blades travel, the particles of water in the air change direction and impinge against the rotating blade structure. The water collects upon the surface of the blades and because of the rotation of the blades, tend to be expelled outwardly due to centrifugal action.

It is appreciated that the air and water will be subject to the influence of centrifugal force and also the forces driving the air stream through the apparatus and axially through the eliminator.

To assist the blades in their eliminating action, means are provided which will at least partially enclose the periphery of the eliminator. With such a construction the air under the partial influence of centrifugal force may create a high pressure area about the periphery of the eliminator beneath the enclosing means. This pressure is relieved by the passage of air axially through the blades. Water particles however are forced outwardly and are permitted to collect at the enclosing means where the water may be further joined by the water collected at the seal and returned to the apparatus. Because of the conical surface of the enclosing means of the embodiment shown in FIGURE 1 centrifugal force will urge this collected water to flow outwardly along the conical surface until the water is passed back into the apparatus.

Referring to FIGURE 6 air laden with water particles enters the blade structure in the direction of the arrow. In the case of the eliminator indicated in FIGURE 1, the motor may drive the eliminator structure in either direction; considering first, the motor driving the blades in a counterclockwise (downward) direction, air may first impinge against the surface 41 of the planar member 35. In such a case a particle of water will impinge upon this surface 41 and because of the rotation of the eliminator blades will be cast outwardly by centrifugal force. Simultaneously particles of water collecting upon surface 41 may travel to the juncture 37 at which point the tendency will be for the droplets of water to fall from this edge and leave this blade structure for the adjoining blade structure and fall upon the surface 40 of the planar member 36 of the adjoining blade. Because of the counterclockwise (downward) motion of the blades, the deflective action of the surface 40 which is angularly disposed with respect to the rotation of the blade structure will cause a deflective force to urge the water particle in the direction of the crevice 38. Since this crevice extends radially, particles of water captured therein will be cast outwardly to the enclosing means and thence back into the apparatus.

Consider a particle of water which is struck by the rotating eliminator and comes into contact with the surface 39 of the planar member 35. In such a case the particle of water is simultaneously acted upon by the centrifugal forces induced by the rotation of the eliminator and by the deflective forces of the angularly disposed surface 39 which will cause the water particle to flow downwardly to the crevice 38 and mingle with the water collected on the surface 40 and return to the apparatus.

Considering now operation wherein the blades shown in FIGURE 6 travel in a clockwise (upward) direction, water particles carried into the eliminator structure will impinge upon the rotating surface 41 of each blade. As the particle of water impinges thereupon it will be subject to centrifugal action which will cast the particle outwardly toward the enclosing means. Simultaneously there will be induced upon the water particle a deflective action caused by the angular disposition of the surface 41. Since the blade structure is moving in a clockwise (upward) direction the deflective action will cause the particle of water to flow outwardly towards the edge of the blade, away from the juncture 37. In such case there will be no tendency of the water to bypass the intersection of the members 35 and 36 and water will flow directly from the surface 41 to the enclosing means and back into the apparatus. In this embodiment the members 36 of each blade member will be utilized in a deflecting capacity. It will be apparent that as the air passes through the structure, it is passing in a relatively upward position and in order to counteract this direction, the surface 40 deflects the air stream and changes its direction to cause the air to flow from the eliminator structure in a general axial direction rather than in a direction which is substantially normal to the axial air flow through the structure.

Referring to the embodiment as illustrated in FIGURE 2, there is shown an eliminater structure which is similar to that illustrated in FIGURES 1 and 4. However, in this embodiment no motive means are directly provided for the eliminator. Instead of the motor 19 as shown in FIGURE 1, FIGURE 2 shows a bearing from which extends a shaft upon which the hub 24 is mounted. In such an application, the eliminator is freely mounted and may rotate in a direction responsive to the forces causing rotation which may be induced upon said structure. In an apparatus of the type illustrated in FIGURE 1, it is remembered that the fan-motor 6 through the agency of the blades 7 induces a substantial air stream through the apparatus. In the embodiment as illustrated in FIGURE 2 the velocity of this air stream is utilized to rotate the eliminator structure. Two forces cause the rotation of the eliminator structure in this embodiment. The first force is the result of the impingement of the air stream as it passes through the eliminator against the angular surfaces of the blades. When this occurs a resultant vector force is created in a plane normal to the axis of rotation of the eliminator and thereby causes a rotation of the eliminator structure. There is also a second force causing rotation of the eliminator structure. The origin of this force is more obscure and operates on a jet principle. It is a reactive force of the air stream emerging from the eliminator structure at an angle and causing impingement against the side wall of the exit duct; as this air stream impinges against the exit duct at an angle, there is a reaction against the eliminator structure which causes the eliminator structure to rotate. Referring to FIGURE 6, it can be seen that the reactive force of a stream of air passing between the surface 40 and 42 will be on the surface 39.

Considering the blade structure of FIGURE 6 utilizing the air stream as a motive force for the eliminator, it has been found that the forces acting against the surfaces 41 and 42 have reaction components which substantially equalize one another; in such an operation, the reactive forces previously mentioned will cause the eliminator blades to rotate in an upward direction. In such operation, only the surface 41 will be engaged in elimination of water particles from the air stream and the channels between the elements 36 of the various blades will be utilized to provide the motive means for the eliminator.

It will be readily appreciated that the members 35 and 36 may be suitably proportioned and angularly displaced so that rotation components of the air stream velocity may be unbalanced to cause rotation and the algebraic sum of all the forces against these surfaces may be sufficient as to overcome any reactive force which may cause rotation.

Having described the two forces which cause rotation on the eliminator one skilled in the art could readily vary the blade construction to have the rotation of the eliminator in either direction. Should the direction chosen be counterclockwise (downward) the operation would be similar to that outlined when the blade travels counterclockwise when motor driven.

In FIGURE 7, there is shown a blade structure which comprises three planar members which are all angularly disposed. In the light of the teachings enunciated above, such a construction shows a means in which the rotative force caused by the impingement of the air stream against the angular surfaces and the rotative force caused by the reaction of an air stream leaving the eliminator, can be made cumulative so that the basic V cross-section can be more efficient in its free wheeling operation. This type of construction also suggests a means for speed control in which case it is clearly seen that the rotation of the eliminator can be made directly dependent upon the velocity of the air stream and in this way the speed of the eliminator can be suitably controlled.

In FIGURE 8, there is shown the basic V construction with a slight modification. In this particular construction, the members 35 and 36 do not terminate at the intersection 37; member 35 extends slightly and overlaps the intersection 37. On the member 36 there is shown a channel 46 which has a general hook shape. In operation, with air traveling in the direction of the arrow and considering the blade structure to be traveling counterclockwise (downward), any particles of water which flow along the surface 41 will tend to pass the juncture 37 onto the protuberance 45. However, because of the deflective action of the rotating eliminator, the water will tend to collect at the tip of the protuberance and fall onto the surface 40, rather than slide along the back of the protuberance 45 onto the surface 42 and out of the eliminator. This is a refinement which may be desired in certain applications.

In certain cases when the blade structure is traveling counterclockwise (downward) the velocity of the air passing through the eliminator may induce droplets of water in surface 40 into the air stream thus causing the droplets to be carried out through the eliminator structure instead of collecting in the crevice 38. Should this occur, water will flow outwardly into the channel 46 where it will be collected and prevented from passing through the eliminator. In such case the water will be induced by centrifugal force to pass upwardly to the periphery of the eliminator in the channel 46 and onto the enclosing means and out of the eliminator structure and back into the apparatus.

Referring to FIGURES 9 and 10, there are shown modifications of the basic blade construction having the V cross-section. Referring specifically to FIGURE 9, there is shown a blade structure having an arcuate cross-section. It is apparent that the operation of such a blade will be similar to the function of the basic V cross-section illustrated and described fully in FIGURE 6. FIGURE 10 is a refinement of the arcuate cross-section of FIGURE 9 employing a double bend and, in operation, the blades of FIGURE 10 function similarly to the blade structure illustrated in FIGURE 7. In both the embodiments of FIGURE 9 and FIGURE 10, the structures are responsive to the same deflective and reaction forces which propel the structures illustrated in FIGURES 6, 7 and 8. However, these forces do not act upon planar surfaces but rather upon curved surfaces, and the water in certain operations will not collect in an angular crevice but will rather collect in radially extending curved troughs.

In comparing the constructions illustrated in FIGURES 4 and 5, it will be seen that essentially the blade and seal construction and the basic end section of the apparatus are similar. However, in FIGURE 5 it is noted that the blades are in a sweep-back arrangement. In FIGURE 4 the line of intersection between the first and second planar members which constitute each blade lie in a plane which is normal to the axis of rotation of the eliminator. In FIGURE 5 it is seen that the line of intersection between the first and second planar members which constitute the blades lie within a conical surface which is concentric with the axis of rotation of the eliminator. The purpose of this modification in FIGURE 5 is readily apparent when FIGURE 6 is considered. FIGURE 6 illustrates the basic V cross-section of blade. Considering this basic V cross-section to be traveling in a counterclockwise (downward) direction with particles of water collecting in the crevice 38 formed by the intersection of members 35 and 36, it will be appreciated that a droplet of water on the surface 40 will be subjected to both centrifugal forces and forces which will tend to carry the droplet along the surface and out of the eliminator. This latter force is the force due to the velocity of the air traveling through the eliminator structure. As previously mentioned, there is a third force acting upon the droplet, namely, one which is a deflective force tending to urge this droplet into the crevice 38. In certain applications, it will be readily seen that the velocity of air may be such as to overcome this deflective action and cause carry-over. This situation may be ameliorated by a construction similar to FIGURE 5.

Considering FIGURES 5 and 6, it will be seen that a droplet of water landing on the surface 40 of member 36 will be subject to centrifugal force. Following a particle of water on the surface, if the particle is driven outwardly by centrifugal force, it will tend in most cases to intersect the juncture 37 of the first and second planar members 35 and 36. In such a construction a situation wherein the velocity forces out-weigh the deflective forces acting on water particles on the surface 40, centrifugal action is utilized to maintain the eliminator efficiency. Various blade constructions have been illustrated and described in FIGURES 6, 7, 8 and 9 and 10. It will be recognized that teachings in each figure may be embodied in other figures without leaving the spirit of the present invention. As previously mentioned the basic V may be changed to vary the various angles between the members employed, the length of the various planar members may be varied to obtain certain results and certain radially extending protuberances and channels may be incorporated therein without leaving the scope of the present invention.

Referring to FIGURE 4 it can be seen that the water collected upon the blades of the eliminator are sent to an enclosing means 16. Recalling the operation of the eliminator it will be remembered that it is intended to utilize the pressure difference across the eliminator to pass the air therethrough and simultaneously the enclosing structure is intended to provide means for removing the water from the eliminator. Though it is not necessary, it has been found preferable to incorporate the enclosing means into the rotating eliminator structure. In the eliminator illustrated in FIGURES 1, 4 and 5, this enclosing means comprises a conical surface concentrically mounted on the eliminator structure. In operation as water flows outwardly along the eliminator blade structure, it reaches the enclosing means at which time these droplets of water collect and because of centrifugal action are returned to the apparatus. Referring to FIGURE 4, this is accomplished by having the conical member converge in the direction of air flow through the eliminator. This provides a conical member which is expanding into the second cylindrical section 4 of the apparatus. As previously mentioned, particles of water on the conical surface will be urged outwardly and because of the increase in diameter of the enclosing means in the direction of the spray chamber, the particles of water will be urged in substantial counterflow to the air flow passing through the eliminator, and in this manner the water is returned to the apparatus.

As previously described there is a seal construction associated with the conical enclosing means and the flange 17 of the cylindrical section 4. Because of the fan inducing air into the apparatus and the diffusing action of the transition section 5, there is a static pressure built up within the second section 4. Since there is a difference in static pressure between the second section 4 and the exit duct from the apparatus, this difference in pressure causes the air stream to pass through the eliminator structure. Because of the rotative nature of the eliminator and the stationary nature of the apparatus, some slight space exists between the eliminator and the apparatus. Considering also that there is a resistance to air flow through the eliminator, it is appreciated that air laden with water will attempt because of the aforementioned pressure difference to pass through this space between the eliminator and the casing. Under some circumstances this blow-by may undermine the effectiveness of the eliminator. To overcome the passage of water particles through this space, there has been devised a sealing structure which operates on a similar principle to the eliminator employed in the apparatus.

Referring to FIGURE 4 there is shown the previously described plurality of spaced annular members. As air laden with water under the influence of the static pressure attempts to by-pass the eliminator it enters the space between the annular members 26 and 28, particles of water impinging on the annular members 26 and 28 previously mentioned, will be urged outwardly by centrifugal force, passed along the extended surface 25 of the conical member 16 and back into the apparatus. Water which may be carried by the air stream into the annular channel 29 will pass radially outward because of the change in direction within the seal and water will either collect on the second side of the annular member 26 or along the surface 25 of the enclosing means. Any water which collects on 26 will be urged outwardly by centrifugal action and join the water collected on the surface 25 where this water will then continue along the surface 25 and join the water which passed from the eliminator blades onto the closing means and then pass back into the apparatus. Air which may pass through this torturous path provided by the seal will join air passing through the eliminator blades and pass from the apparatus. The principle of operation of this seal is not to provide a throttling action through the seal but rather to permit the water in the air stream to impinge upon the outer rotating structure and remain thereon so that the water may be directed back into the apparatus. It has been found that distances between the stationary and rotating members may be as great as ¼ of an inch without impairing the operation of this seal.

The invention has been disclosed as utilized in air conditioning systems, however, it will be apparent that this type system may be utilized merely for its air washing capabilities. Furthermore, it is apparent that the eliminator structure can be used in applications wherein it is desired to remove liquid particles from a gas stream passing through the eliminator structure. It is also noted that the particular type apparatus disclosed with its rotating eliminators are highly commended for air and gas washing operations in which a liquid would be utilized to wash the gas stream and the eliminator would remove liquid particles from the gas stream as it leaves the apparatus and pass the liquid containing foreign particles back into the apparatus.

A characteristic of this rotating eliminator which is of particular interest is its tendency to be self-cleaning. Because of its rotational nature, forces may be exerted on the liquid particles many times greater than the gravitational action relied on in stationary eliminators so that the water and dirt particles will always be subject to centrifugal forces many times greater than any adhesive forces thereby insuring clean eliminator blades. An application for this type of apparatus with its eliminator exists in textile mills wherein not only is the air humidified but also it is cleaned by the washing action of the water. In stationary eliminators, the wet lint coats the eliminator surfaces requiring frequent and extensive maintenance. It has been found that this rotating eliminator structure is sufficiently effective to maintain itself free from wet lint.

While I have described preferred embodiments of the invention it will be understood the invention is not limited thereto since it may be otherwise embodied within the scope of the following claims.

I claim:

1. In a rotary eliminator for removing droplets of water from an air stream, a hub rotatably mounted on a substantially horizontal axis, a plurality of blades extending radially therefrom, and means secured to said blades for at least partially enclosing the periphery of said blades, each of said blades comprising a first planar member having a desired surface area adapted to be exposed to an air stream and a second planar member having a surface substantially similar to the surface area of the first member adapted to be exposed to the air stream, said members being angularly disposed and intersecting in lines drawn substantially radially of the axis of rotation of said eliminator, and a portion defining a channel associated with the edge of said second planar member, adjacent blades overlapping one another to define a plurality of axial paths, each having at least one change in direction.

2. A rotary eliminator according to claim 1 in which the first planar member extends slightly beyond the line of intersection of the first and second planar members.

3. In an apparatus for removing entrained liquid from a gas stream, the combination of a casing, said casing having a portion defining an opening therein; means for passing a gas stream through said casing; and an eliminator located adjacent to and concentric with said portion defining an opening in said casing, said eliminator comprising a rotatably mounted hub, a plurality of blades radially extending from said hub portions of adjacent blades overlapping one another to define a plurality of uniform axial paths having at least one change in direction, each blade having at least a first planar portion extending substantially from the axis of rotation and having a desired surface area exposed to the air stream and a second planar portion extending substantially from the axis of rotation and having a surface area substantially similar to the surface area of the first portion exposed to the air stream, said planar portions intersecting in a line drawn substantially radially of the axis of rotation, a portion defining a channel associated with the edge of said second planar member, and enclosing means at the periphery of said radially extending blades.

4. In an eliminator for removing droplets of water from an air stream, a rotatably mounted hub, a plurality of blades extending therefrom, each of said blades having at least a first planar portion extending substantially from the axis of rotation and having a desired surface area exposed to the air stream and a second planar portion extending substantially from the axis of rotation and having a surface area substantially similar to the surface area of the first portion exposed to the air stream, said portions being angularly disposed with respect to each other and intersecting in a line drawn radially from said hub, a portion defining a channel associated with the edge of said second planar member, adjacent blades overlapping one another to define a plurality of uniform axial paths, each having at least one change in direction, and means for at least partially enclosing the periphery of said blades.

References Cited in the file of this patent

UNITED STATES PATENTS

| | | |
|---|---|---|
| 233,171 | Swan | Oct. 12, 1880 |
| 602,868 | Nilson | Apr. 26, 1898 |
| 1,215,288 | Lake | Feb. 6, 1917 |
| 1,480,775 | Marien | Jan. 15, 1924 |
| 1,511,834 | Marien | Oct. 14, 1924 |
| 1,527,355 | Gentile | Feb. 24, 1925 |
| 1,833,674 | Fedeler | Nov. 24, 1931 |

FOREIGN PATENTS

| | | |
|---|---|---|
| 329,240 | Germany | Nov. 19, 1920 |